US006905256B2

(12) United States Patent
Morse et al.

(10) Patent No.: US 6,905,256 B2
(45) Date of Patent: Jun. 14, 2005

(54) OPTICAL CONNECTOR ADAPTER FOR INTERFACING SINGLE OR MULTICHANNEL WAVEGUIDE DEVICES TO FIBER AND METHOD OF FORMING SAME

(75) Inventors: Randall K. Morse, Palm Bay, FL (US); Robert J. Licciardi, Melbourne, FL (US); Donald M. Ball, Palm Bay, FL (US); Michael R. Lange, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 376 days.

(21) Appl. No.: 09/988,906

(22) Filed: Nov. 20, 2001

(65) Prior Publication Data

US 2003/0095758 A1 May 22, 2003

(51) Int. Cl.⁷ ................................................. G02B 6/36
(52) U.S. Cl. ............................ 385/89; 385/49; 385/52; 385/53
(58) Field of Search ............................. 385/49, 59, 52, 385/53, 65, 89, 78, 83

(56) References Cited

U.S. PATENT DOCUMENTS

| | | | |
|---|---|---|---|
| 5,042,709 A | 8/1991 | Cina et al. ................... 228/105 |
| 5,337,398 A | 8/1994 | Benzoni et al. ................ 385/90 |
| 5,729,641 A | 3/1998 | Chandonnet et al. ........... 385/2 |
| 5,774,614 A | 6/1998 | Gilliland et al. ............... 385/88 |
| 6,056,448 A | 5/2000 | Sauter et al. .................. 385/92 |
| 6,068,410 A | 5/2000 | Giebel et al. .................. 385/72 |
| 6,085,003 A | 7/2000 | Knight .......................... 385/59 |
| 6,130,977 A | 10/2000 | Rosson ......................... 385/76 |
| 6,168,317 B1 | 1/2001 | Shahid .......................... 385/71 |
| 6,206,579 B1 | 3/2001 | Selfridge et al. ............. 385/60 |
| 6,249,627 B1 | 6/2001 | Bond et al. .................... 385/49 |
| 6,352,372 B1 * | 3/2002 | Shahid .......................... 385/59 |
| 6,386,767 B1 * | 5/2002 | Naghski ....................... 385/59 |

* cited by examiner

*Primary Examiner*—Zandra V. Smith
*Assistant Examiner*—Juan D Valentin, II
(74) *Attorney, Agent, or Firm*—Allen, Dyer, Doppelt, Milbrath & Gilchrist, P.A.

(57) ABSTRACT

An optical connector adapter advantageously interfaces waveguide devices using passive alignment. The connector adapter includes a substrate for transporting optical signals and having opposing ends and a top reference surface and single side reference surface. A carrier bracket is received over the top reference surface at either end and includes substrate alignment fiducials for aligning the top and side reference surfaces. A substrate carrier receives the substrate and carrier bracket as a subassembly and has carrier alignment fiducials for aligning to the side reference surface and top reference surface and interfacing a waveguide device.

21 Claims, 7 Drawing Sheets

OPTICAL CONNECTOR ADAPTER FOR INTERFACING SINGLE OR MULTICHANNEL WAVEGUIDE DEVICES TO FIBER AND METHOD OF FORMING SAME

FIELD OF THE INVENTION

This invention relates to the field of optical connectors and interfaces, and more particularly, this invention relates to an optical connector adapter for interfacing single or multichannel waveguide devices to fiber.

BACKGROUND OF THE INVENTION

One major obstacle in the precision connection of optical fibers, including the connection of optical multichannel waveguide devices, MTP connectors and similar devices, is the critical alignment of an optical waveguide to its signal input and output. This is especially critical when various optical components are interfaced to ribbonized fibers when used in conjunction with single or multichannel optical fiber waveguides or similar optical components.

In some prior art techniques, a substrate has a number of channels that are aligned with fibers by actively passing light through the optical fibers and/or devices to align the optical fibers. A power meter is typically used to measure the percentage of light passing through the connected device and optical fiber to assure that the fiber alignment is correct. Once any optical fiber and connector alignment is determined to be correct, epoxy is dropped over the substrate and optical fiber to bond and cure the optical fibers into a set position. This process is known as "active alignment" and is a very labor intensive process, requiring high skill and the use of high precision opto-mechanical alignment systems.

One prior art technique to overcome these drawbacks is a precision passive alignment technique used for connecting MTP multifiber connectors and similarly designed optical connector applications. The MTP connector assembly includes a precise multifiber array and ferrule and passive alignment mechanism formed by two guide holes and pins. An example of such passive alignment MTP connector assembly is disclosed in the technical paper, *MT Multifiber Connectors and New Applications*, 44th Electronic Components and Technology Conference, 1994, the disclosure which is hereby incorporated by reference in its entirety. A passive alignment accuracy of 2 micrometers has been obtained for a number of fibers with that technique. The passive alignment between a multimode 12-fiber ribbon terminated with the MT (or MTP) connector and a vertical cavity surface emitting laser (VCSEL) array of 10 micrometer active diameter held a high percentage of coupling efficiency. This allowed a fiber ribbon-to-fiber ribbon connection using an intermediate connector as described.

It would be advantageous if a waveguide interface could be provided as a passive alignment optical connector adapter for interfacing single or multichannel waveguide devices to fiber, such as by coupling a MTP connectorized ribbon adapter and multichannel waveguide device, such as an amplifier. This could occur without any intermediate steps as in the prior art, allowing automated coupling and connection directly to the multichannel waveguide device, including ferrules, modulators, waveguides, amplifiers and similar optical devices.

SUMMARY OF THE INVENTION

The present invention is advantageous and provides an optical connector adapter for interfacing a single or multichannel waveguide devices to fiber and a method of forming same. A substrate is provided that transports optical signals and has opposing ends, a top reference surface and only a single side reference surface. A carrier bracket is received over the top reference surface at either end of the substrate. Substrate alignment fiducials align the top and side reference surfaces of the substrate relative to the carrier bracket. A substrate carrier receives the substrate and carrier bracket and has carrier alignment fiducials for aligning the side reference surface and top reference surface of the substrate relative to the substrate carrier and carrier bracket for interfacing waveguide devices thereto.

In one aspect of the present invention, the substrate comprises a waveguide substrate having waveguides implanted within the top reference surface and defined by a precision semiconductor masking. In yet another aspect of the present invention, the substrate is formed as a semiconductor waveguide substrate having silica waveguides deposited on the top reference surface and defined by precision semiconductor masking. The substrate can include a substrate holder having a plurality of precision grooves formed within the top reference surface and defined by semiconductor masking techniques. The substrate holder can be formed from one of silicon or glass, including a molded silica resin composite or ceramic.

In yet another aspect of the present invention, the top reference surface is a precision polished, optically flat reference surface and to side reference surface is a lithographically defined and formed, precision reference surface. To form the side reference surface, a mask could first be applied to the top of the polished substrate forming the top reference surface. The alignment marks or fiduciaries are formed and a technician creating the piece can grind off or polish back to the mark or fiduciaries to create that side reference surface. Thus, it is lithographically defined, i.e., laying the mask down and defining where the surface is required and forming it to that requirement.

In yet another aspect of the present invention, the substrate is a molded substrate having precision molded top and side references. The substrate alignment fiducials are alignment pins on which the top and side reference surfaces engage. The alignment pin is set within each carrier bracket such that an alignment pin is positioned tangent to the top and side reference surfaces. Alignment pins can also be positioned within the carrier bracket for aligning a waveguide device thereto. Any grooves that are contained within a substrate holder can be formed substantially parallel to each other and can be dimensioned to receive single mode fiber with an optical core of less than about 9 microns or multimode fiber.

In one method of forming an optical connector adapter for interfacing waveguide devices, a substrate holder is formed and has opposing ends. A top reference surface is formed with grooves therein for receiving optical fiber. A single side reference surface is formed. The grooves are formed to be spaced a predetermined distance from the side reference surface. A carrier bracket is positioned over the top reference surface at each end and aligns the carrier bracket relative to the top and side reference surfaces of the substrate holder and uses alignment fiducials positioned on the carrier bracket. The substrate holder is inserted into a substrate carrier. The top reference surface and single side reference surface are aligned relative thereto for interfacing with the waveguide device.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously is an improvement over prior art devices that allow the alignment of two optical fiber connectors such as MT multifiber connectors and ferrules and similar applications. An example is an MT connector that connects a precise multifiber array using a passive alignment mechanism formed by two guide holes and pins.

In the present invention, an optical connector adapter interfaces single or multichannel waveguide devices to fiber by allowing single or multichannel passive alignment. These waveguide devices could include modulators, amplifiers, MTP connectors and similar optical devices. Thus, the prior art techniques of individually pigtailing optical fibers, using active alignment techniques and epoxy bonding with labor intensive active alignment and multiaxis devices, is no longer required.

Figure 1:
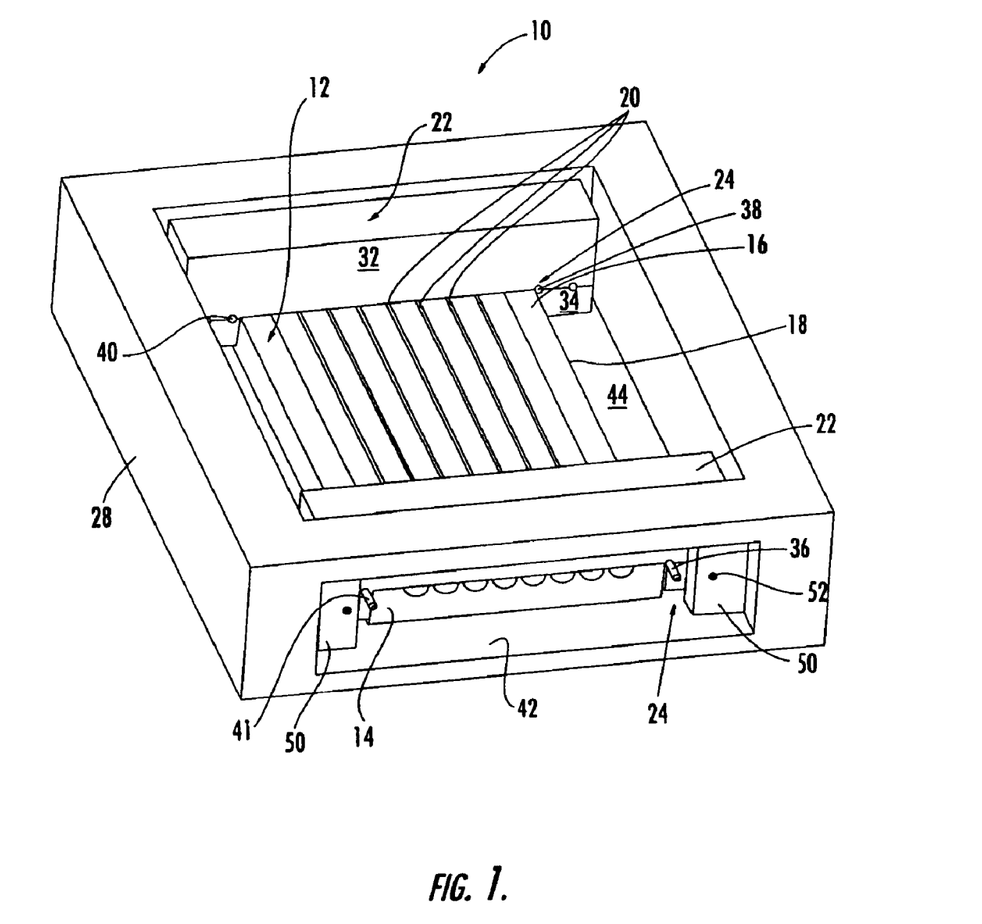
FIG. 1 is a perspective view of an optical connector adapter of the present invention for interfacing fiber to a single or multichannel waveguide device.
Figure 2:
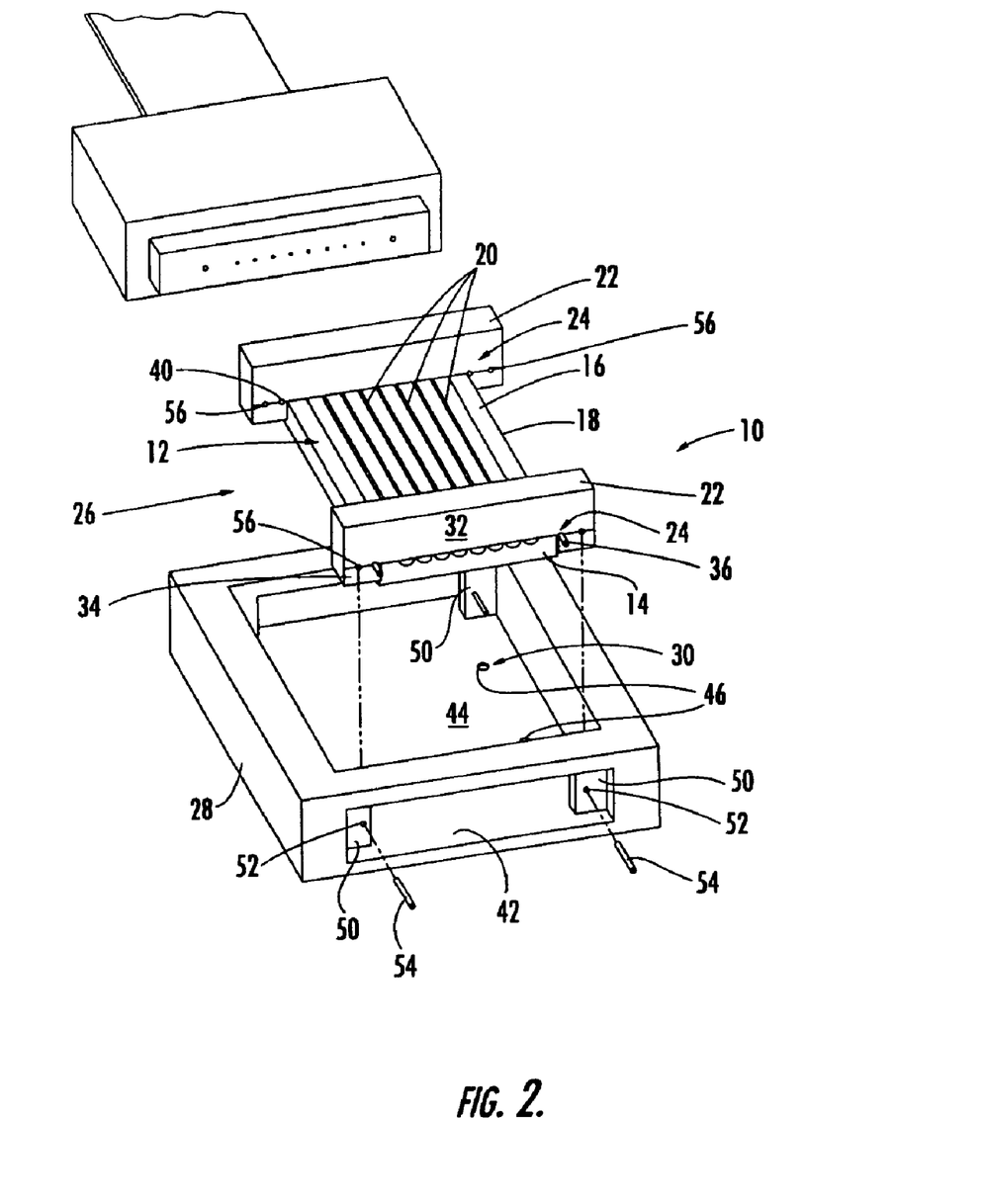
FIG. 2 is an exploded isometric view of the optical connector adapter shown in FIG. 1 and showing the substrate and carrier brackets received thereon and removed from the carrier, and a multichannel waveguide device that would be interfaced thereto.

FIG. 1 illustrates an optical connector adapter of the present invention that interfaces single or multichannel waveguide devices to fiber, such as a waveguide device shown in FIG. 2, illustrated as an MTP connector. The basic elements of the optical connector adapter of this present invention are a substrate 12 that has opposing ends 14 similarly formed to each other, a top reference surface 16 and a single side reference surface 18 that is orthogonal to the top reference surface, as illustrated. In a preferred aspect of the invention, only one side reference surface 18 is formed, saving manufacturing costs because only two, high precision reference surfaces are formed, while other surfaces, i.e., the other side, bottom and end surfaces, can be formed as lower tolerance surfaces. Both reference surfaces are formed as precision reference surfaces by different techniques depending on the type of substrate that is used.

The substrate is formed for transporting optical signals and could be formed as a waveguide substrate having waveguides implanted within the top reference surface and defined by precision semiconductor masking. The substrate could be formed as a semiconductor waveguide substrate having silica waveguides deposited on the top reference surface and defined by precision semiconductor masking. The substrate could also be formed as a substrate holder having a plurality of precision grooves formed within the top reference surface and defined by semiconductor masking techniques. The substrate holder could be formed from one of silicon or glass. The substrate holder could also be formed from a molded silica resin composite or ceramic.

In one aspect of the present invention, the top reference surface could be formed as a precision polished, optically flat reference surface and the side reference surface could be formed as a lithographically defined and formed precision reference surface. The substrate could be a molded substrate having a precision molded top and side reference surface. For example, in formation, the top reference surface could be polished optically flat within nanometers of flatness. The side reference surface is then lithographically defined. For example, a mask can be placed on top of the polished substrate and some type of alignment marks or fiduciaries are formed by the mask. Any technician creating the substrate will grind off or polish back to that mark or fiduciary to create the precision side reference surface. Thus, it is lithographically defined on top and ground or polished back at the side surface to the fiduciaries. Any alignment pins that are used as described below could be used when the substrate is a molded piece, whether a thermoset plastic, silica resin, or ceramic.

In one illustrated embodiment, the substrate is formed as a substrate holder having a plurality of fiber channels 20 formed as grooves on the top reference surface in which optical fiber is received and spaced a predetermined distance from the side reference surface 18.

As illustrated, a carrier bracket 22 is received over the top reference surface 16 at either end 14 and includes substrate alignment fiducials 24 that align the top and side reference surfaces 16, 18 of the waveguide substrate 12 relative to the carrier bracket 22. The waveguide substrate 12 and attached carrier brackets 22 form a carrier subassembly 26 that is received within a substrate carrier 28, also having carrier alignment fiducials for aligning the side reference surface 18 and top reference surface 16 relative to the substrate carrier, and thus, allowing aligned connection of any optical fiber received within the channels on the top reference surface with a waveguide device connected thereto, as further explained below.

Referring now to FIGS. 6–9, there are illustrated greater details of the substrate 12 of the present invention.

The substrate 12 is substantially rectangular configured and has opposing ends 14. Through preferred molding, semiconductor masking and photolithography techniques or other techniques known to those skilled in the art, the top reference surface 16 and the single side reference surface 18 are formed substantially orthogonal to each other. These reference surfaces are the only two critical reference surfaces required for the present invention, as compared to many other high precision prior art connectors and assembly techniques that require a larger number of reference surfaces, each having a very high surface precision relative to each other.

Through techniques known to those skilled in the art, the plurality of optical fiber receiving channels 20, or grooves, are formed on the top reference surface 16 and optical fiber is received therein, such as single mode fiber having an optical core of less than about 9 microns or multimode fiber. Naturally, the fiber is larger, such as 125 microns, with some single mode fiber. Multimode fiber can have cores of about 50 or 62.5 micron diameter. Thus, because the channels or grooves have been formed to have precise distance from the side reference surface, any received optical fiber is spaced a predetermined distance from the side reference surface 18.

Figure 9:
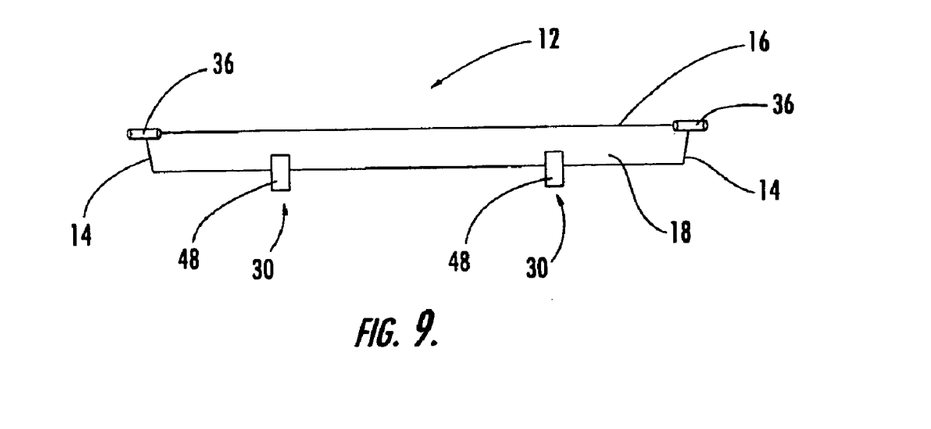
FIG. 9 is a side elevation view of the substrate shown in FIG. 6.

As shown in FIG. 9, the ends 14 of the substrate 12 can include an angled surface for connecting single mode fiber or a flat surface (not illustrated) for connecting multimode fiber, as known to those skilled in the art. Although any number of optical fiber receiving channels or grooves 20 can be formed on the top reference surface 16, typically 12 or 24 channels are formed for connecting to the industry common 12 or 24 channel devices. Typically, with single mode fiber, the waveguide optical core is about 9 microns and can be spaced about 250 microns from center-to-center. In one aspect of the present invention, the waveguide substrate 12 could be injection molded, or it could be formed by other manufacturing techniques known to those skilled in the art.

Figure 3:
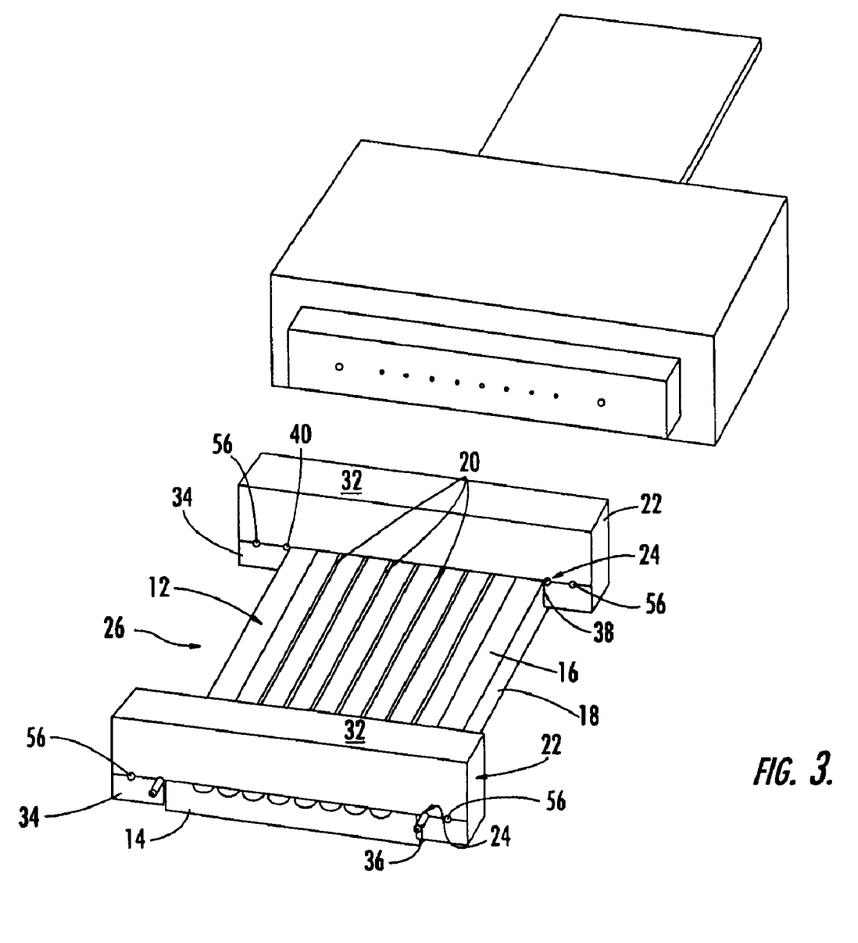
FIG. 3 is an isometric view of the substrate and attached carrier brackets and a multichannel waveguide device.
Figure 4:
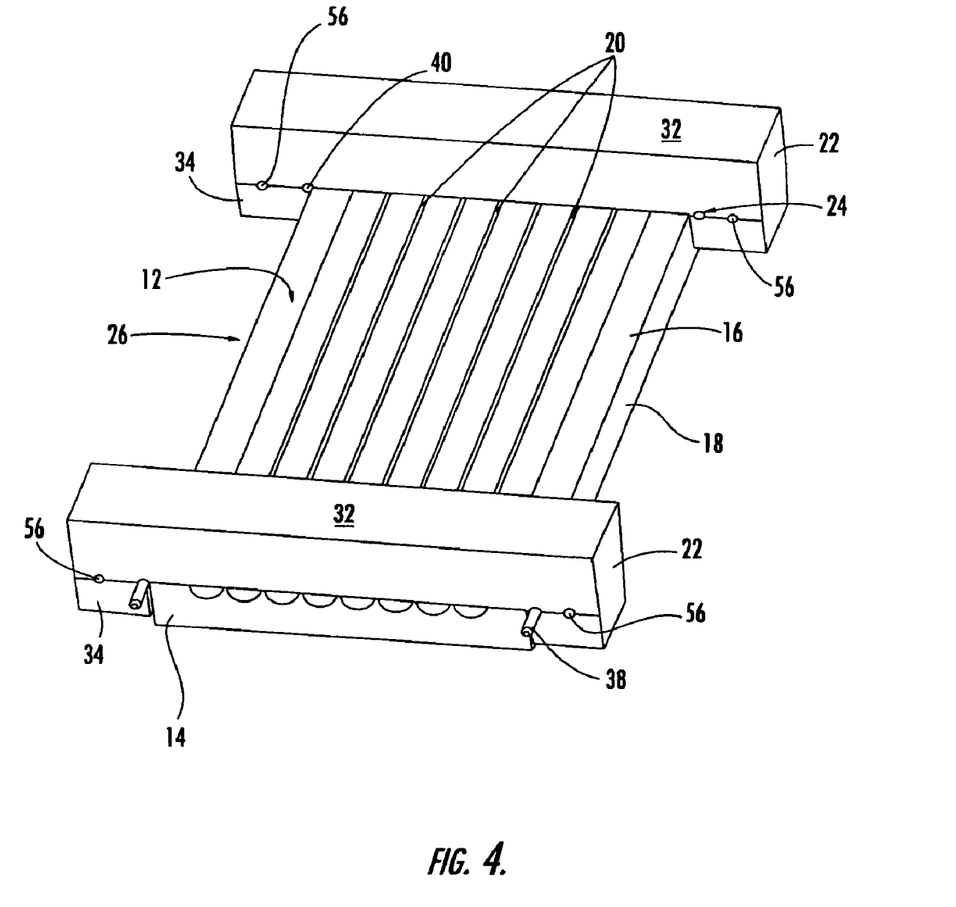
FIG. 4 is another isometric view of the substrate and carrier brackets received over the top reference surface at either end of the substrate.

As more clearly shown in FIGS. 2–4, the carrier brackets 22 are received over the top reference surface 16 at either end. The carrier brackets can be formed from a thermosetting resin, such as an epoxy resin, a phenolic resin, or other thermosetting resins suggested by those skilled in the art. This carrier bracket 22 is formed as a precision molded part, using molding techniques known to those skilled in the art. Although precision tolerances required for molding the carrier bracket are high, these tolerances are not as those tolerances required when forming the top and side reference surfaces on the substrate 12 using semiconductor masking and photolithography techniques.

Figure 5:
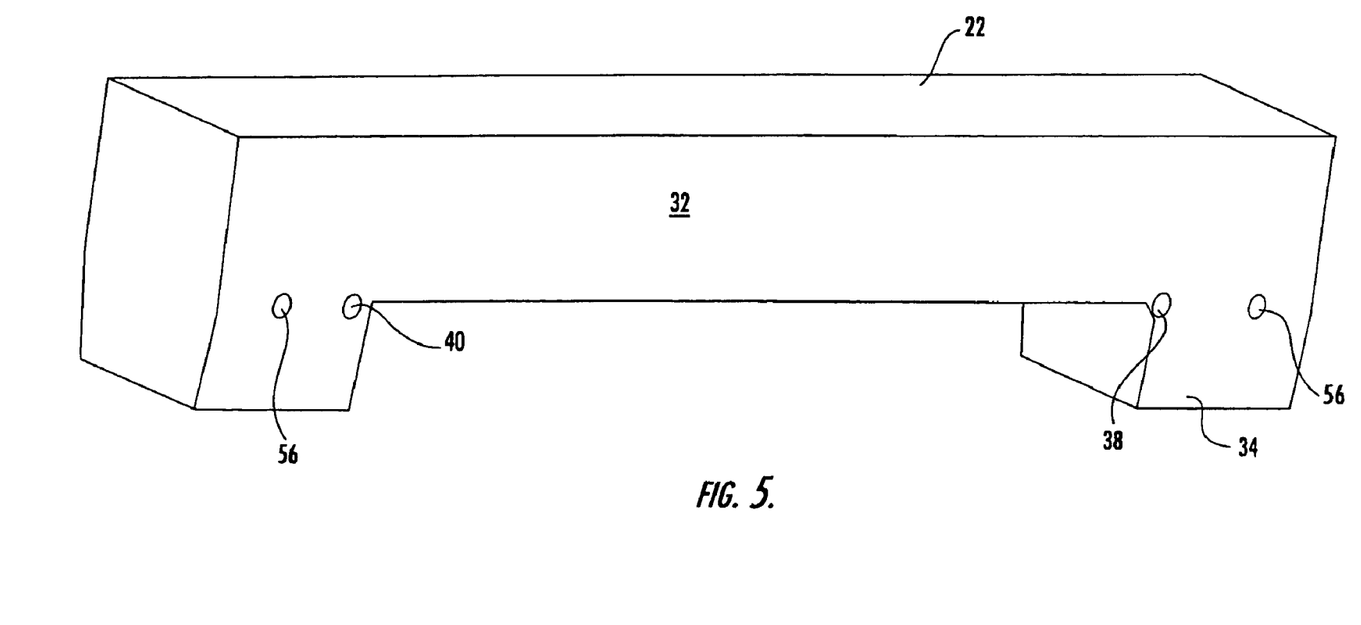
FIG. 5 is an enlarged isometric view of a carrier bracket of the present invention.
Figure 6:
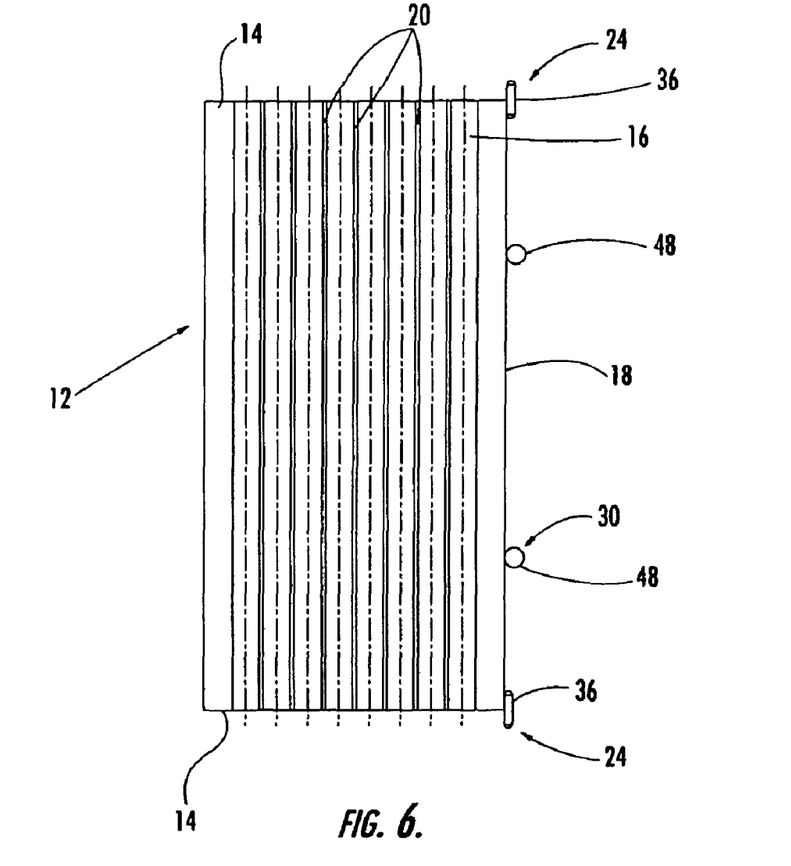
FIG. 6 is a top plan view of the substrate shown in the previous figures.
Figure 7:
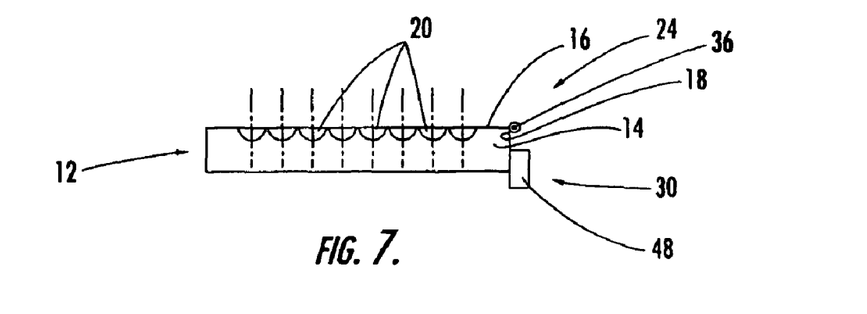
FIG. 7 is an end elevation view of the substrate shown in FIG. 6.
Figure 8:
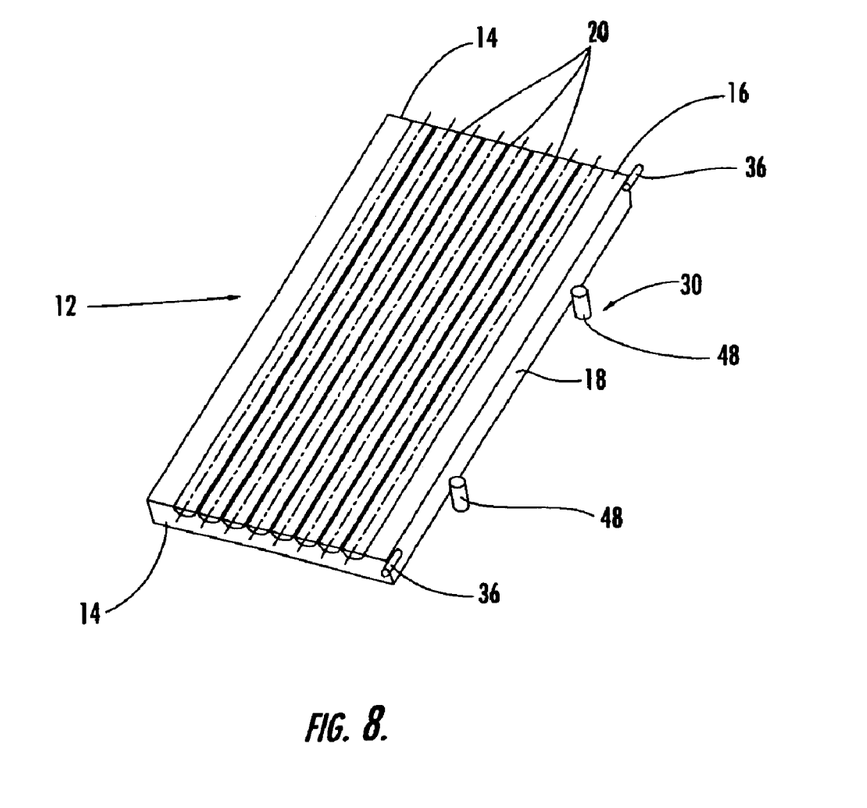
FIG. 8 is a perspective view of the substrate shown in FIG. 6.

In one aspect of the present invention, the carrier bracket 22 is formed as a truncated, inverted "U" with a horizontally extending top lateral support 32 and two, short, "stub" legs 34 depending at its ends therefrom, as shown in FIG. 5. Substrate alignment fiducials 24 form datum references for aligning the top and side reference surfaces 16, 18. In a preferred aspect of the present invention, the fiducials 24 include an alignment pin 36 received within a precisely arranged, interior guide hole 38 formed such as by precision molding or drilling at the inside corner of the lateral support 32 and one leg 34. For clarity, the guide holes 38 at the rear of various drawing FIGS. 1, 2, 3 and 4 are shown without the received alignment pin. The alignment pin 36 is positioned tangent (FIG. 8) to the top and side reference surfaces when the carrier bracket is received over the top reference surface. This is clearly shown in FIGS. 6–9 where the alignment pin 36 is shown to engage the top and side reference surfaces 16,18, precisely aligning the side end top reference surfaces, and thus the fiber channels relative to the known, molded or drilled location of the guide hole 38 and alignment pin 36.

FIG. 5 illustrates in detail the position of the guide hole 38 at the formed corner, and positioned to receive an alignment pin 36 such that reference surfaces 16,18 would be tangent. Another interior guide hole 40 is spaced a predetermined and precise amount from the initial guide hole containing the alignment pin at the other "stub" leg. This guide hole 40 could be set tangent to the top and side reference surfaces, but this is not necessary since only one side is mandated as the precise reference surface as described before. Alignment pin 41 is received in guide hole 40, as illustrated. The two interior guide holes 38, 40 receive the alignment pins that are later used for interconnection into a multichannel waveguide device, as shown in FIG. 3.

FIGS. 1 and 2 illustrate how the carrier subassembly 26 that is formed from the substrate 12 and carrier bracket 22 are received within the substrate carrier 28, which also includes carrier alignment fiducials 30 for aligning the side reference surface of the waveguide substrate 12 into a predetermined position, and thus aiding in aligning the connection points of any optical fiber received within the channels 20 on the top reference surface 16 with a multichannel waveguide device connected thereto. The substrate carrier can also be formed from a thermosetting plastic material, such as an epoxy resin, phenolic resin, or other similar thermosetting plastic resin. The substrate carrier is also a precisely molded part and includes a bottom surface 44 having two guide holes 46 containing alignment pins 48 that as a carrier alignment fiduciary 30 on which the side reference surface 18 of the waveguide substrate 12 engages, as shown schematically in FIG. 8.

The device openings 42 are rectangular configured and include attachment tabs 50 having guide holes 52 that are formed in linear alignment with guide holes 46 and alignment pins 48 positioned in the bottom surface 44 of the substrate carrier. These guide holes 52 formed on the attachment tabs 50 receive alignment pins 54 within outer guide holes 54 formed on the carrier bracket 22 such that the carrier bracket will be aligned relative to the substrate carrier.

It is thus evident that a waveguide device can be snapped onto the connector of the present invention via the inner guide pins that are used to align the top and side reference surfaces and via the corner bracket substrate carrier. This unique optical connector adapter facilitates passive alignment and interfaces waveguide devices without extensive alignment steps.

As illustrated best in FIGS. 2 and 3, the substrate 12 and carrier bracket 22 have substantially coplanar front edges. The alignment of the various pins allows self-centering of the components relative to each and most importantly, relative to the top and side reference surfaces. Spring clips or other retention clips known to those skilled in the art can be used to retain the optical connector adapter to any multichannel waveguide device. The precision tolerances defined for the two surfaces 16, 18 is set by the semiconductor masking and photolithography selected by those skilled in the art, as well as the tolerances associated with the fiber channels. This allows alignment of components at submicron levels together with the top and side reference surfaces. It is possible to interface a waveguide device, including an array of laser diodes, which is important in many telecommunications applications. The geometric referencing and any molding or semiconductor masking and photolithography allows precise alignment in conjunction with the various alignment pins and allows the carrier brackets to be received as a subassembly within the substrate carrier at high precision.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications That which is claimed is:

1. An optical connector adapter for interfacing waveguide devices comprising:
   a single substrate for transporting optical signals and having opposing ends, a substantially planar top reference surface formed as an optically flat polished surface, and including at least one of an implanted waveguide, deposited silica waveguide, and precision grooves at the top reference surface, and a substantially planar single optically flat, polished side reference surface formed substantially orthogonal to the top reference surface;
   a carrier bracket received over the top reference surface at either end of the substrate, and including substrate alignment fiducials for aligning the top and side reference surfaces of the substrate relative to the carrier bracket; and
   a substrate carrier that receives said substrate and carrier bracket and having carrier alignment fiducials for aligning the side reference surface and top reference surface of the substrate relative to the substrate carrier and carrier bracket for interfacing waveguide devices thereto.

2. An optical connector adapter according to claim 1, wherein said substrate holder is formed from one of silicon or glass.

3. An optical connector adapter according to claim 1, wherein said substrate holder comprises one of a molded silica resin composite or ceramic.

4. An optical connector adapter according to claim 1, wherein said substrate comprises a molded substrate having precision molded top and side reference surfaces, and wherein said substrate alignment fiducials comprise alignment pins on which the top and side reference surfaces engage.

5. An optical connector adapter according to claim 4, wherein an alignment pin is set within each carrier bracket such that an alignment pin is positioned tangent to the top and side reference surfaces.

6. The optical connector adapter according to claim 1, and further comprising alignment pins positioned within said carrier bracket for aligning a waveguide device thereto.

7. An optical connector adapter for interfacing waveguide devices comprising:
   a single substrate holder having opposing ends, a substantially planar top reference surface formed as an optically flat polished surface and a substantially planar single optically flat, polished side reference surface formed substantially orthogonal to the top reference surface, said top reference surface having a plurality of grooves formed therein for receiving optical fiber and spaced a predetermined distance from the side reference surface;
   a carrier bracket received over the top reference surface at either end of the substrate holder, and including substrate alignment fiducials for aligning the top and side reference surfaces of the substrate holder relative to the carrier bracket; and
   a substrate carrier that receives said substrate holder and carrier bracket and having carrier alignment fiducials for aligning the side reference surface and top reference surface of the substrate holder relative to the substrate carrier and carrier bracket and aligning any optical fiber received within the grooves on the top reference surface with waveguide devices.

8. The optical connector adapter according to claim 7, wherein said substrate comprises a molded substrate having precision molded top and side reference surfaces, and wherein said substrate alignment fiducials comprise alignment pins on which the top and side reference surfaces engage.

9. The optical connector adapter according to claim 8, wherein an alignment pin is set within each carrier bracket such that alignment pin is positioned tangent to the top and side reference surfaces.

10. The optical connector adapter according to claim 7, wherein each carrier bracket is formed of a thermoset plastic.

11. The optical connector adapter according to claim 7, wherein said substrate carrier is formed of a thermoset plastic.

12. The optical connector adapter according to claim 7, wherein said grooves are formed substantially parallel to each other.

13. The optical connector adapter according to claim where substrate holder is substantially rectangular configured.

14. The optical connector adapter according to claim 7, wherein the grooves are dimensioned to receive single mode fiber with an optical core of less than about nine microns.

15. The optical connector adapter according to claim 7, wherein the grooves are dimensioned to receive multimode fiber.

16. A method of forming an optical connector adapter for interfacing waveguide devices comprising:
   forming a single substrate that transports optical signals and having opposing ends, a substantially planar top reference surface formed as an optically flat polished surface, and including at least one of an implanted waveguide, deposited silica waveguide, and precision grooves at the top reference surface, and a substantially planar single optically flat, polished side reference surface formed substantially orthogonal to the top reference surface;
   positioning a carrier bracket over the top reference surface at either end of the substrate and aligning the top and side reference surfaces of the substrate relative to the carrier bracket using alignment fiducials positioned on the carrier bracket; and
   inserting the substrate having the carrier brackets thereon into a substrate carrier and aligning the top reference surface and single side reference surface relative thereto for interfacing with a waveguide device.

17. A method according to claim 16, and further comprising the step of aligning the carrier brackets on the top reference surface using alignment pins.

18. A method of forming an optical connector adapter for interfacing waveguide devices comprising the steps of:
   forming a single substrate having opposing ends, a substantially planar top reference surface formed as an optically flat, polished surface and having grooves therein for receiving optical fiber, and a substantially planar single optically flat, polished side reference surface formed substantially orthogonal to the top reference surface, wherein the grooves are formed to be spaced a predetermined distance from the side reference surface;
   positioning a carrier bracket over the top reference surface at each end and aligning the carrier bracket relative to the top and side reference surfaces of the substrate holder using alignment fiducials positioned on the carrier bracket; and inserting the substrate holder having the carrier brackets positioned thereon into a substrate carrier and aligning the top reference surface and single side reference surface relative thereto for interfacing with a waveguide device.

19. A method according to claim 18, and further comprising the step of aligning the carrier brackets on the top surface using alignment pins.

20. A method according to claim 18, and further comprising the step of aligning the carrier bracket relative to the substrate holder using alignment pins.

21. A method according to claim 18, and further comprising the step of aligning each carrier bracket relative to the substrate holder using an alignment pin that is set within each carrier bracket such that an alignment pin is positioned tangent to top and side reference surfaces.

* * * * *

UNITED STATES PATENT AND TRADEMARK OFFICE
CERTIFICATE OF CORRECTION

PATENT NO. : 6,905,256 B2  
DATED : June 14, 2005  
INVENTOR(S) : Randall K. Morse et al.

It is certified that error appears in the above-identified patent and that said Letters Patent is hereby corrected as shown below:

<u>Column 6,</u>  
Line 22, delete "that as a" insert -- that act as a --.

<u>Column 8,</u>  
Line 20, delete "claim where" insert -- claim 7, where --.

Signed and Sealed this

Eighth Day of November, 2005

JON W. DUDAS  
*Director of the United States Patent and Trademark Office*